United States Patent
Yamashita et al.

(10) Patent No.: US 11,448,931 B2
(45) Date of Patent: Sep. 20, 2022

(54) METHOD FOR REPAIRING BROKEN LINE, ARRAY SUBSTRATE AND ACTIVE MATRIX DISPLAY DEVICE

(71) Applicant: Everdisplay Optronics (Shanghai) Co., Ltd., Shanghai (CN)

(72) Inventors: Keitaro Yamashita, Shanghai (CN); Shanglong Wang, Shanghai (CN); Ruili Wang, Shanghai (CN); Chihkang Chen, Shanghai (CN)

(73) Assignee: Everdisplay Optronics (Shanghai) Co., Ltd, Shanghai (CN)

( * ) Notice: Subject to any disclaimer, the term of this patent is extended or adjusted under 35 U.S.C. 154(b) by 97 days.

(21) Appl. No.: 17/111,491

(22) Filed: Dec. 3, 2020

(65) Prior Publication Data
US 2021/0173268 A1     Jun. 10, 2021

(30) Foreign Application Priority Data
Dec. 5, 2019   (CN) .......................... 201911236809.3

(51) Int. Cl.
*G02F 1/1362*      (2006.01)

(52) U.S. Cl.
CPC .. *G02F 1/136259* (2013.01); *G02F 1/136286* (2013.01)

(58) Field of Classification Search
CPC .................................................. G02F 1/1362
See application file for complete search history.

(56) References Cited

U.S. PATENT DOCUMENTS

| 5,202,778 | A | * | 4/1993 | Niki | G02F 1/1309 |
| | | | | | 349/189 |
| 2011/0109863 | A1 | * | 5/2011 | Liu | G02F 1/136259 |
| | | | | | 445/2 |
| 2014/0118658 | A1 | * | 5/2014 | Tong | G02F 1/136259 |
| | | | | | 257/59 |

FOREIGN PATENT DOCUMENTS

CN            101592797       * 12/2009 ............... G02F 1/13

* cited by examiner

*Primary Examiner* — Sang V Nguyen
(74) *Attorney, Agent, or Firm* — Qinghong Xu (57) ABSTRACT

The present disclosure relates to the field of display technology, and provides a method for repairing broken line, an array substrate, and an active matrix display device. The method for repairing broken line comprises: providing an array substrate including a data driving circuit disposed in the bottom peripheral area, a plurality of data lines derived from the data driving circuit and extending to the top peripheral area through the active area, a repair line derived from the data driving circuit and extending along the side peripheral area and the top peripheral area, detecting each of the data lines of the array substrate to determine a broken data line including a first section and a second section disconnected with each other; performing laser-welding on an laser intersection position between the broken data line and the repair line in the top peripheral area to weld the broken data line and the repair line; forming, by disconnecting the repair line near the intersection position in the top peripheral area, a repair section which is extending from the data driving circuit to be conductive connected with the second section, and signals are introduced to two disconnected sections of the broken data line from the data driving circuit, and the data driving circuit and the repair section, respectively. The present disclosure can achieve a high (Continued)

repair success rate of the broken data line and a small resistance-capacity loading after repairing.

15 Claims, 7 Drawing Sheets

METHOD FOR REPAIRING BROKEN LINE, ARRAY SUBSTRATE AND ACTIVE MATRIX DISPLAY DEVICE

CROSS-REFERENCE TO RELATED APPLICATIONS

The present disclosure is based upon and claims priority of Chinese Patent Application No. 201911236809.3, filed on Dec. 5, 2019, the contents of which are hereby incorporated by reference in its entirety.

TECHNICAL FIELD

The present disclosure relates to the field of display technology, and in particular, to a method for repairing a broken line, an array substrate, and an active matrix display device.

BACKGROUND

In production process of an active matrix display device, product yield will be affected by semiconductor process limitations. For example, in high-resolution processes, broken of data lines is becoming increasingly serious.

Laser repair can be used to repair the broken data line to reduce yield loss. According to existing repair solutions, it is usually repaired by welding a broken position of a data line, which caused a problem that a repair success rate and product load cannot be balanced It should be noted that the information applied in the background section above is only used to enhance the understanding of the background of the present disclosure, and therefore may include information that does not constitute the prior art known to those of ordinary skill in the art.

SUMMARY

The present disclosure provides a method for repairing broken line, an array substrate, and an active matrix display device to achieve a high repair success rate of a broken data line and a small resistance-capacity loading after repairing.

A first aspect of the present disclosure provides a method for repairing broken line, including: providing an array substrate, wherein the array substrate comprises an active area and a bottom peripheral area, a side peripheral area, and a top peripheral area surrounding the active area, the array substrate including a data driving circuit disposed in the bottom peripheral area, a plurality of data lines derived from the data driving circuit and extending to the top peripheral area through the active area, a repair line derived from the data driving circuit and extending along the side peripheral area and the top peripheral area; detecting each of the plurality of data lines of the array substrate to determine a broken data line including a first section and a section disconnected with each other; performing laser-welding on intersection position between the broken data line and the repair line in the top peripheral area; forming, by disconnecting the repair line near the intersection position in the top peripheral area, a repair section derived from the data driving circuit and extending along a first side peripheral area and a part of the top peripheral area to be conductive connected with the second section, wherein, among two disconnected sections of the broken data line, for the first section, signals are introduced from the data driving circuit, and for the second section, signals are introduced from the data driving circuit and the repair section.

In an embodiment, the disconnection repair method further includes: performing, in part of the top peripheral area between the broken data line and the first side peripheral area laser-cutting on intersection positions between the data lines and the repair section, until each of the data lines located between the broken data line and the first side peripheral area is disconnected from the repair section.

In an embodiment, all of the data lines of the array substrate are divided into a plurality of data line groups each comprising a number of data lines as a group; in the top peripheral area, each of the data lines in each of the data line groups is connected to the repair line through a common wiring; and the method further comprises: performing laser-cutting on the common wiring of each of the data line groups located between the broken data line and the first side peripheral area, until each of the data lines in each of the data line groups located between the broken data line and the first side peripheral area is disconnected from the repair section.

In an embodiment, in the step of performing laser-welding on the intersection position between the broken data line and the repair line, two or more laser welding points are disposed at the intersection position between the broken data line and the repair line, and all of laser welding points are located in the top peripheral area.

In an embodiment, in the top peripheral area, the array substrate comprises: a base substrate, a first metal layer, an intermediate insulating layer, and a second metal layer which are sequentially stacked, the repair line being disposed at the first metal layer, and each of the data lines being disposed at the second metal layer.

A second aspect of the present disclosure provides an array substrate, including: an active area and a bottom peripheral area, a side peripheral area, and a top peripheral area surrounding the active area a data driving circuit, disposed in the bottom peripheral area; a plurality of data lines, respectively derived from the data driving circuit and extending to the top peripheral area through the active area, the plurality of data lines comprising at least one broken data line each including a first section and a section disconnected with each other; a repair line, derived from the data driving circuit and extending along the side peripheral area and the top peripheral area; and a laser welding point, disposed at intersection position between the broken data line and the repair line and located in the top peripheral area, wherein the broken data line is configured to be welded to the repair line through the laser welding point; wherein, in the top peripheral area, the repair line is configured to be disconnected near the intersection position to form a repair section derived from the data driving circuit and extending along a first side peripheral area and a part of the top peripheral area to be conductive connected with the second section, and among two disconnected sections of each broken data line, for a first section, signals are introduced from the data driving circuit, and for a second section, signals are introduced from the data driving circuit and the repair section.

In an embodiment, the array substrate further includes, the laser cutting point, disposed at the intersection positions between each of the data lines and the repair section located between the broken data line and the first side peripheral area, and located in the top peripheral area, each of the data lines located between the broken data line and the first side peripheral area being disconnected from the repair section.

In an embodiment, all of the data lines of the array substrate are divided into a plurality of data line groups each comprising a number of data lines; in the top peripheral area, each of the data line in each of the data line groups is connected to the repair line through a common wiring; and the laser cutting point is disposed on the common wiring of each of the data line groups between the broken data line and the first side peripheral area, each of the data lines in each of the data line groups located between the broken data line and the first side peripheral area being disconnected from the repair section.

In an embodiment, two or more laser welding points are disposed at the intersection position between the broken data line and the repair line, and all of the laser welding points are located in the top peripheral area.

In an embodiment, in the top peripheral area, the array substrate comprises a base substrate, a first metal layer, an intermediate insulating layer, and a second metal layer, which are sequentially stacked, and the repair line is disposed at the first metal layer, and each of the data lines is disposed at the second metal layer.

A third aspect of the present disclosure provides an active matrix display device including the array substrate according to any of the above embodiments.

It should be understood that the above general description and the following detailed description are merely exemplary and explanatory, and should not limit the present disclosure.

BRIEF DESCRIPTION OF THE DRAWINGS

The drawings herein, which are incorporated in and constitute a part of the description of the present disclosure, illustrate embodiments consistent with the present disclosure, and together with the description serve to explain the principles of the present disclosure. Obviously, the drawings described below are only some embodiments of the present disclosure. For those of ordinary skill in the art, other drawings can be obtained based on these drawings without creative efforts.

DETAILED DESCRIPTION

Example embodiments will now be described more fully with reference to the accompanying drawings. However, the exemplary embodiments can be implemented in various forms and should not be construed as being limited to the embodiments set forth herein. Rather, these embodiments are provided so that this disclosure will be thorough and complete, and will fully convey the concept of example embodiments to those skilled in the art. Same reference numerals in the drawings denote the same or similar structures, and their repeated description will be omitted.

Specifically, in an active matrix display device, an insulating layer is disposed between a metal layer where a data line is located and another metal layer where a repair line is located. Thickness of the insulating layer will affect success rate of repair and resistance-capacitance load after repairing. If a data line corresponding to an area of the insulation layer with a large thickness is broken, the success rate of laser repair there is low, but the resistance-capacity load is small if the repair is successful, which has a small impact on the product. If a data line corresponding to an area of the insulation layer with a small thickness is broken, the success rate of laser repair there is high, but meanwhile, the resistance-capacity load is large if the repair is successful, which affects product performance.

Figure 1:
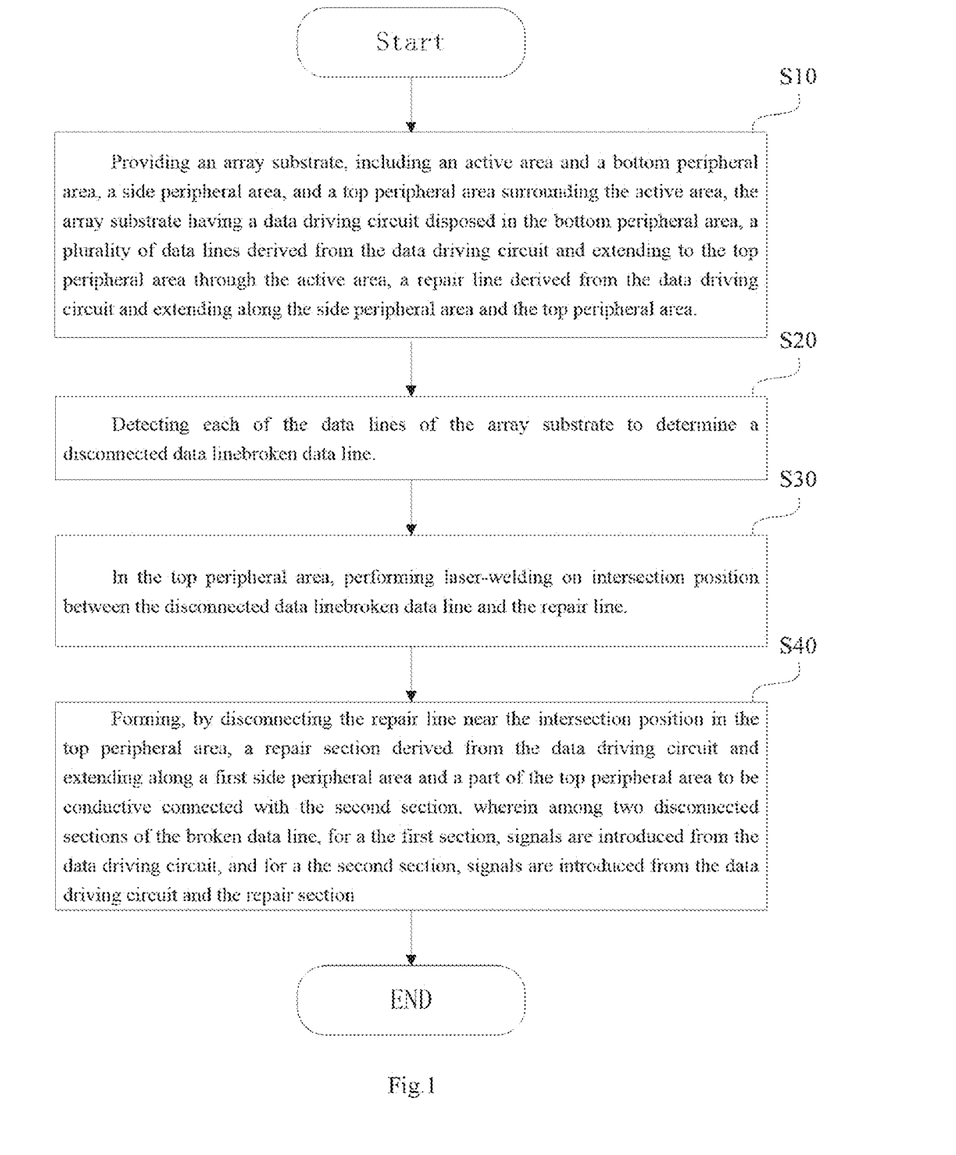
FIG. 1 shows a step flowchart of a method for repairing broken line according to an embodiment of the present disclosure.

FIG. 1 shows the main steps of a method for repairing a broken line according to an embodiment. Referring to FIG. 1, in this embodiment, the method for repairing a broken line includes the following steps S10 to S40. At S10, an array substrate is provided, the array substrate including an active area and a bottom peripheral area, a side peripheral area, and a top peripheral area surrounding the active area, the array substrate including a data driving circuit disposed in the bottom peripheral area, a plurality of data lines derived from the data driving circuit and extending to the top peripheral area through the active area, and a repair line derived from the data driving circuit and extending along the side peripheral area and the top peripheral area. At S20, each of the plurality of data lines of the array substrate is detected to determine a broken data line including a first section and a second section disconnected with each other. At S30, in the top peripheral area, an intersection position between the broken data line and the repair line is welded in the top peripheral area by laser to weld the broken data line and the repair line. At S40, the repair line near the intersection position in the top peripheral area is disconnected to form a repair section, which is derived from the data driving circuit and extending along a first side peripheral area and a part of the top peripheral area to be conductive connected with the second section of the broken data line, and among two disconnected sections of the broken data line, for the first section of the broken data line, signals are introduced from the data driving circuit, and for the second section of the broken data line, signals are introduced from the data driving circuit and the repair section.

In the method for repairing broken line of this embodiment, the repair line extends along the peripheral area of the array substrate, laser repair of the broken data line is performed in the peripheral area, an insulation layer of the array substrate in the peripheral area is thin, success rate of the laser repair is high without affecting the active area, and thus product stability is ensured. By disconnecting the repair line near the intersection position between the broken data line and the repair line, on the one hand, coupling between the repair line and other data lines is reduced, and on the other hand, after disconnecting, a part of the repair line other than the repair section can be used to repair other broken data lines to increase utilization of the repair line.

Figure 2:
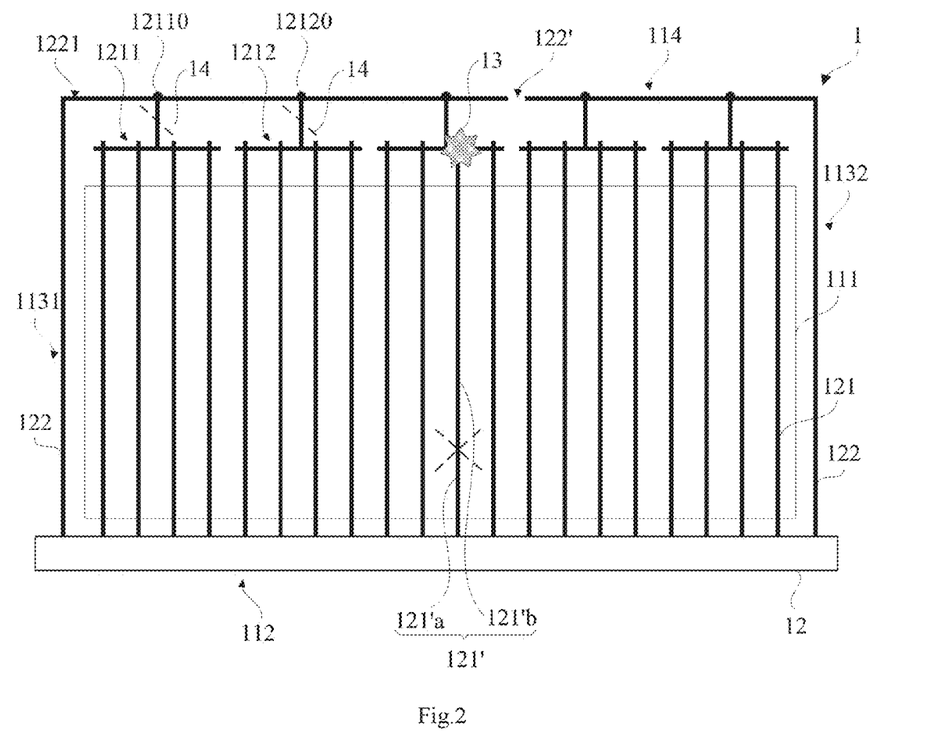
FIG. 2 is a schematic top view of an array substrate according to an embodiment of the present disclosure.

FIG. 2 shows a top view structure of an array substrate in an embodiment. Referring to FIG. 2, the array substrate 1 in this embodiment includes an active area 111, and a bottom peripheral area 112, a side peripheral area (including a first side peripheral area 1131 and a second side peripheral area 1132) and a top peripheral area 114 which are provided to surround the active area 111. Pixel units are disposed in the active area 11, and the pixel units are driven by a scan signal transmitted by a scan line and a data signal transmitted by a data line (the present disclosure mainly relates to repair of the broken data line, so structures such as the pixel unit and the data line are not shown in FIG. 2). Each of data lines 121 is derived from a data driver circuit (Driver IC) 12 disposed in the bottom peripheral area 112 of the array substrate 1, driven and controlled by the data driver circuit 12, connected to a row of pixel units in the active area 111, and extends vertically to the top peripheral area 114 through the active area 111. A repair line 122 is disposed in a periphery of the data line 121 and derived from the data driving circuit 12, extending along the side peripheral area and the top peripheral area 114. The data line indicated by the dashed line "x" in FIG. 2 is a broken data line 121' determined after detection and the dotted line "x" indicates a position of breakpoint of the broken data line 121', which is located in the active area 111. The broken data line 121' is divided into two disconnected sections by the breakpoint, including a first section 121'a and a second section 121'b. For the first section 121'a connected to the data driving circuit 12, signals are allowed to be introduced from the data driving circuit 12 to drive the pixel units connected thereto; and for the second section 121'b which is disconnected from the data driving circuit 12, driving signals from the data driving circuit 12 cannot be introduced, thereby adversely affecting light emission of the pixel unit connected thereto. Therefore, by performing laser-welding on the intersection position between the broken data line 121' and the repair line 122 in the top peripheral area 114, the second section 121'b of the broken data line 121' and the repair line 122 are welded, so that signals can be introduced to the second section 121'b of the data line 121' from the data driving circuit 12 and the repair line 122 to drive the pixel units connected thereto. A laser welding point 13 is disposed at the intersection position between the broken data line 121' and the repair line 122, and located in the top peripheral area 114. The laser welding repair in the top peripheral area 114 has a high success rate without adversely affecting the active area 111.

Further, referring to FIG. 2, in the top peripheral area 114, the repair line 122 extends until the broken data line 121' is allowed to be conductive and then is disconnected. That is, the repair line 122 is disconnected near the intersection position between the repair line 122 and the broken data line 121'. A notch 122' is provided to form a repair section 1221 derived from the data driving circuit 12 and extending along the first side peripheral area 1131 and part of the top peripheral area 114 to be conductive connected with the second section of the broken data line 121'. Among the two disconnected sections of the broken data line 121', for a first section 121'a, signals are introduced from the data driving circuit 12, and for a second section 121'b, signals are introduced from the data driving circuit 12 and the repair section 1221.

In order to reduce the resistance and capacitance (RC) loading after the repair, in an embodiment, the method for repairing broken line further includes: in the top peripheral area performing laser-cutting on intersection position of each of the data lines, between the broken data line and the first side peripheral area, and the repair section located, and thereby disconnecting each of the data lines located between the broken data line and the first side peripheral area from the repair section. The laser-cutting can prevent unnecessary capacitive coupling between other data lines and repair lines, thereby preventing insufficient driving of the repair lines and the pixels thereon. Through a plurality of laser cutting operations, the RC load after the repair is reduced. The parasitic capacitance after the repair is a function of the number of laser cutting points, which is $C_P = C_{TOTAL}/(n+1)$, where CP is the parasitic capacitance after the broken data line is repaired. $C_{TOTAL}$ is a total parasitic capacitance, and n is the number of laser cutting points. It can be seen that the RC load can be reduced by laser-cutting.

On one hand, the laser cutting can reduce the RC load, and on the other hand, the laser cutting can affect the success rate of laser repair. The success rate of laser repair is $P_{L1} = P_{12} * P_C^n$, where $P_{12}$ is success rate of laser welding, and $P_C$ is success rate of laser cutting. The specific values of $P_{12}$ and $P_C^n$ depend on process conditions and laser equipment conditions. As the number of laser cutting points' n increases, that is, as the number of laser cutting increases, the success rate of laser repair will be affected. Therefore, in an embodiment, a plurality of data lines are divided into groups to implement the cutting with the repair line. Specifically, all of the data lines of the array substrate are divided into a plurality of data line groups and each includes a number of data lines. In the top peripheral area, the data lines in each of the data line groups are connected to the repair line through a common wiring. During laser cutting, the common wiring of each of the data line groups located between the broken data line and the first side peripheral area is cut, so that each of the data lines in each of the data line groups located between the broken data line and the first side peripheral area is disconnected from the repair section.

Referring to FIG. 2, a first data line group 1211 and a second data line group 1212 are exemplarily illustrated, and each of the data line groups includes four data lines 121. Each of the data lines 121 in the first data line group 1211 is connected to the repair section 1221 of the repair line 122 through a first common wiring 12110, the first common wiring 12110 being located at the intersection position between each of the data lines 121 in the first data line group 1211 and the repair section 1221; each of the data line 121 in the second data line group 1212 is connected to the repair section 1221 of the repair line 122 through a second common wiring 12120, the second common wiring 12120 being located at the intersection position between each of the data lines 121 in the second data line group 1212 and the repair section 1221. During laser cutting, the positions of laser cutting points 14 are shown by the diagonal lines on a first common wiring 12110 and a second common wiring 12120. The first common wiring 12110 and the second common wiring 12120 are cut to disconnect each of the data lines 121 in the first data line group 1211 and each of the data lines 121 in the second data line group 1212 from the repair section 1221. Therefore, the number of laser cuttings can be reduced, and the success rate of laser repair can be improved while reducing the RC load.

Figure 3:
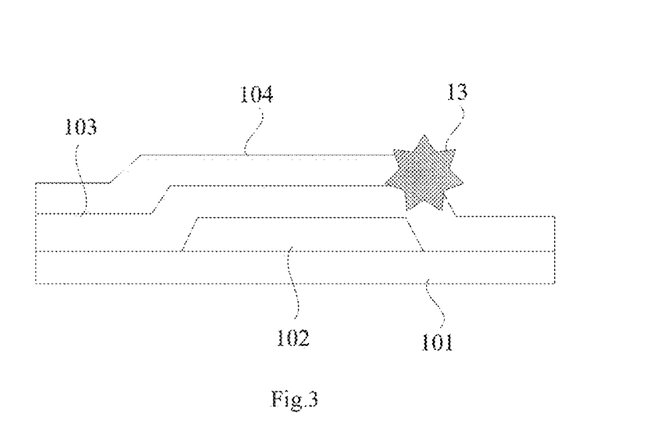
FIG. 3 is a schematic cross-sectional view of an array substrate when laser welding is performed according to the embodiment shown in FIG. 2.
Figure 4:
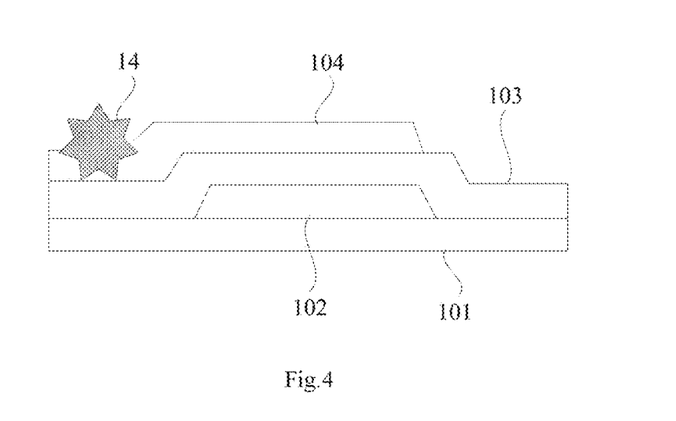
FIG. 4 is a schematic cross-sectional view of an array substrate when laser cutting is performed according to the embodiment shown in FIG. 2.
Figure 5:
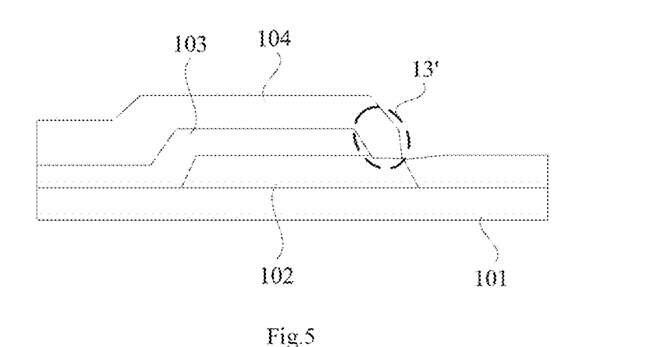
FIG. 5 is a schematic cross-sectional view of an array substrate when a broken data line is repaired according to the embodiment shown in FIG. 2.

FIG. 3 shows a cross-sectional structure when the laser welding is performed according to the above embodiment, FIG. 4 shows a cross-sectional structure when the laser cutting is performed according to the above embodiment, and FIG. 5 shows a cross-sectional structure of a broken data line after repair according to the above embodiment. As shown in FIGS. 2 to 5, in the top peripheral area 114, the array substrate 1 includes a base substrate 101, a first metal layer 102, an intermediate insulating layer 103, and a second metal layer 104, which are sequentially stacked, and the repair line 122 is disposed at the first metal layer 102 and each of the data lines 121 is disposed at the second metal layer 104. The first metal layer 102 and the second metal layer 104 may be made of a metal such as molybdenum (Mo), and the intermediate insulating layer 103 may be made of a single layer of $SiN_X$, a single layer of $SiO2$, a stack of $SiN_X$, a stack of $SiO2$, or the like. During laser welding, as shown in FIGS. 2 and 3, the laser welding point 13 is applied to the broken data line 121' disposed on the second metal layer 104, so that the broken data line 121' and the repair line 122 disposed on the first metal layer 102 is welded to form a structure as shown in FIG. 5. The area 13' indicated by a dashed circle shown in FIG. 5 represents a welded structure formed by the laser welding. During laser cutting, as shown in FIG. 2 and FIG. 4, the laser cutting point 14 is applied to the data line 121 disposed at the second metal layer 104, so that the end of the corresponding data line 121 is cut off, thereby obtaining infinite resistance and avoiding coupling with the repair line 122.

Figure 6:
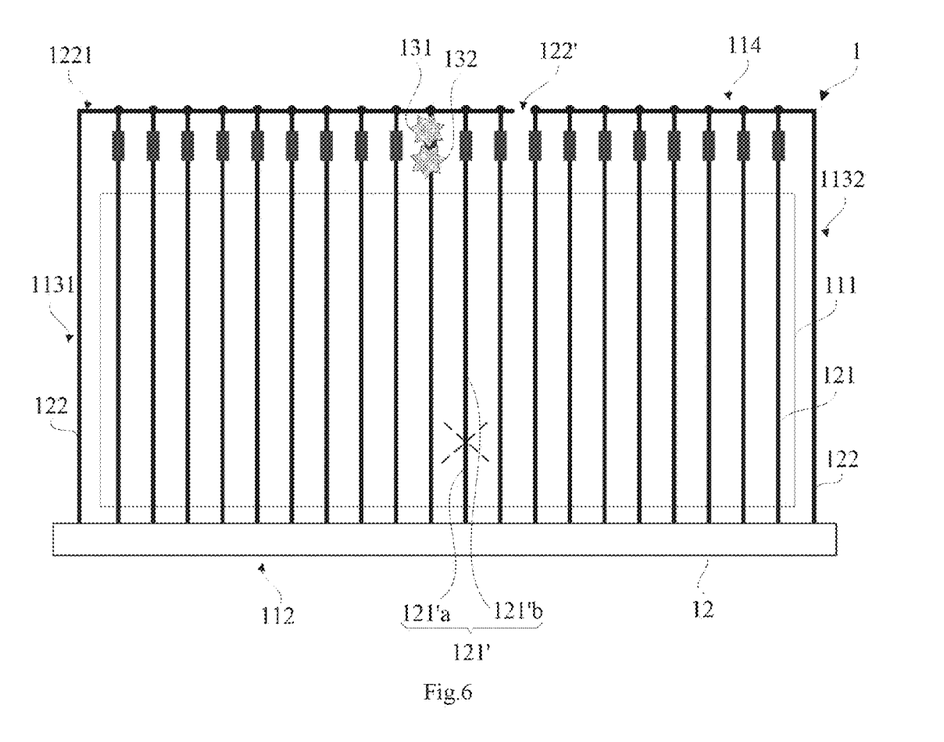
FIG. 6 is a schematic top view of an array substrate according to another embodiment of the present disclosure.

In an embodiment, it is possible to increase the repair success rate and reduce the RC load by increasing the number of laser welding. FIG. 6 shows the array substrate in this embodiment. The same reference numerals in the array substrate 1 shown in FIG. 6 and in the array substrate 1 shown in FIG. 2 represent the same components and principles, and therefore will not be described repeatedly. In this embodiment, in the step of laser welding the intersection position between the broken data line 121' and the repair line 122, two or more laser welding points (for example, including a first laser welding point 131 and a second laser welding point 132) are disposed at the intersection position between the broken data line 121' and the repair line 122, and all of the laser welding points are located in the top peripheral area 114. In order to reduce the total parasitic capacitance, these laser welding points are arranged closely to each other, so as to facilitate laser operation. Repaired parasitic capacitance is $C_P = C_{TOTAL}/m$, where C is the parasitic capacitance after the broken data line is repaired, $C_{TOTAL}$ is the total parasitic capacitance, and m is the number of laser welding points. In this embodiment, if two laser welding points are disposed, the parasitic capacitance after repairing is reduced to half of the original parasitic capacitance. It can be seen that by increasing the number of laser welding, the RC load can be reduced.

Figure 7:
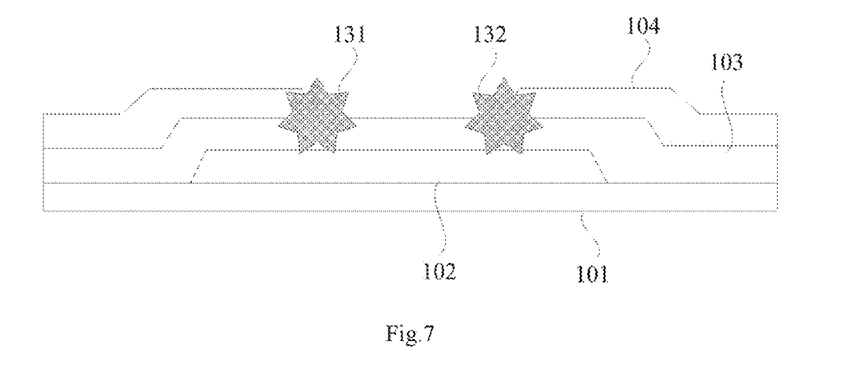
FIG. 7 is a schematic cross-sectional view of laser welding in the embodiment shown in FIG. 6.

FIG. 7 shows a cross-sectional structure of laser welding according to the above embodiment. As shown in FIG. 6 and FIG. 7, in the top peripheral area 114, the array substrate 1 includes a base substrate 101, a first metal layer 102, an intermediate insulating layer 103, and a second metal layer 104, which are sequentially stacked. The repair line 122 is disposed at the first metal layer 102 and each of the data lines 121 is disposed at the second metal layer 104. During laser welding, the first laser welding point 131 and the second laser welding point 132 are applied to the broken data line 121' disposed at the second metal layer 104, preferably covering the edge of the second metal layer 104, and performing welding the broken data line 121' and the repair line 122 disposed at the first metal layer 102 by the laser welding, to perform the repair.

In other embodiments, the broken data line 121' can be laser welded three, four, or more times to greatly reduce the parasitic capacitance after repairing to a greater extent. On the other hand, the repair success rate is affected by the number of laser welding performed. For example, in the embodiments when the laser welding is performed twice, the repair success rate of laser welding is $P_{L2} = P_{12}^2$, where $P_{12}$ is the success rate of laser welding. Therefore, in a preferred embodiment, laser welding can be performed twice or three times to reduce the RC load and increase the success rate of laser repair.

An embodiment of the present disclosure further provides an array substrate, including an active area and a bottom peripheral area, a side peripheral area, and a top peripheral area; a data driving circuit, disposed in the bottom peripheral area; and a plurality of data lines, respectively derived from the data driving circuit and extending to the top peripheral area through the active area, the plurality of data lines including at least one broken data line; a repair line, derived from the data driving circuit and extending along the side peripheral area and the top peripheral area; and a laser welding point, disposed at the intersection position between the broken data line and the repair line, and located in the top peripheral area, the broken data line being welded to the repair line through the laser welding point; in the top peripheral area, disconnecting the repair line near the intersection position to form a repair section derived from the data driving circuit and extending along a first side peripheral area and a part of the top peripheral area to be conductive connected with the second section of the broken data line, among two disconnected sections of the broken data line, for a first section of the broken data line, signals are introduced from the data driving circuit, and for a second section of the broken data line, signals are introduced from the data driving circuit and the repair line. The broken data lines of the array substrate can be repaired by the method for repairing broken line described in any of the above embodiments.

In an embodiment, the structure of the array substrate may be as shown in FIG. 2. In the top peripheral area 114 of the array substrate 1, the repair line 122 extends until the broken data line 121' is allowed to be conductive and then the repair line 122 is disconnected to form the repair section 1221 derived from the data driving circuit and extending along a first side peripheral area and a part of the top peripheral area to be conductive connected with the broken data line 121'. Further, the array substrate 1 is further provided with a laser cutting 14 at the intersection position, which is at the top peripheral area 114, of each of the data lines 121 located between the broken data line 121' and the first side peripheral area 1131 and the repair line 122, such that each of the data lines 121 located between the broken data line 121' and the first side peripheral area 1131 is disconnected from the repair section 1221. In an embodiment, all of the data lines 121 of the array substrate 1 are divided into a plurality of data line groups, and each group includes a number of data lines, for example, a first data line group 1211 and a second data line group 1212 between the broken data line 121' and the first side peripheral area 1131. In the top peripheral area 114, each of the data lines 121 in the first data line group 1211 and the second data line group 1212 is connected to the repair section 1221 of the repair line 122 through the first common wiring 12110 and the second common wiring 12120, respectively. The laser cutting point 14 is disposed on the first common wiring 12110 and the second common wiring 12120, so that each of the data lines 121 of the first data line group 1211 and the second data line group 1212 located between the broken data line 121' and the first side peripheral area 1131 is disconnected from the repair section 1221. According to the array substrate 1 of the embodiment, the RC load can be reduced and the success rate of laser repair can be increased by a combination of laser welding and laser cutting.

In an embodiment, referring to the array substrate 1 shown in FIG. 6, two or more laser welding points are disposed at the intersection position between the broken data line 121' and the repair line 122, for example, a first laser welding point 131 and a second laser welding points 132, and all of the laser welding points are located in the top peripheral area 114. According to the array substrate 1 of the embodiment, the RC load can be reduced and the success rate of laser repair can be increased by performing laser welding multiple times.

Other structures and principles of the array substrate are the same as those described in the above-mentioned method for repairing broken line, so the description will not be repeated.

An embodiment of the present disclosure also provides an active matrix display device, such as an active matrix organic light emitting diode (AM-OLED) or an active matrix liquid crystal display (AM-LCD). The active matrix display device includes the array substrate described in any of the foregoing embodiments, and the broken data lines therein is repaired by performing the method for repairing broken line described in any of the above embodiments, so as to reduce the RC load and increase the success rate of laser repair. The repaired product has stable functions and high reliability.

Compared with the prior art, beneficial effects of the present disclosure include at least: the repair line extends along the peripheral area, and laser welding is performed in the peripheral area to repair the broken data line, so the success rate is high without adversely affecting the active area; by disconnecting the repair line near the intersection position between the broken data line and the repair line, on the one hand, the coupling between the repair line and other data lines is reduced, and on the other hand, the repair line can be used to repair other broken data lines; by laser-cutting, setting more than two laser welding points, etc., the resistance-capacity loading after repairing can be reduced.

The above is a further detailed description of the present disclosure in combination with specific preferred embodiments, and it is not intended to limit the specific implementation of the present disclosure thereto. For those of ordinary skill in the art, without departing from the concept of the present disclosure, several simple deductions or replacements can be made, which should all be regarded as falling within the protection scope of the present disclosure.

What is claimed is:

1. A method for repairing a broken line, comprising:
providing an array substrate, wherein the array substrate comprises an active area and a bottom peripheral area, a side peripheral area, and a top peripheral area surrounding the active area, the array substrate including a data driving circuit disposed in the bottom peripheral area, a plurality of data lines derived from the data driving circuit and extending to the top peripheral area through the active area, a repair line derived from the data driving circuit and extending along the side peripheral area and the top peripheral area;
detecting each of the plurality of data lines of the array substrate to determine a broken data line including a first section and a section disconnected with each other;
performing laser-welding on intersection position between the broken data line and the repair line in the top peripheral area;
forming, by disconnecting the repair line near the intersection position in the top peripheral area, a repair section derived from the data driving circuit and extending along a first side peripheral area and a part of the top peripheral area to be conductive connected with the second section, wherein, among two disconnected sections of the broken data line, for the first section, signals are introduced from the data driving circuit, and for the second section, signals are introduced from the data driving circuit and the repair section.

2. The method according to claim 1, further comprising:
performing, in part of the top peripheral area between the broken data line and the first side peripheral area laser-cutting on intersection positions between the data lines and the repair section, until each of the data lines located between the broken data line and the first side peripheral area is disconnected from the repair section.

3. The method according to claim 2, wherein, all of the data lines of the array substrate are divided into a plurality of data line groups each comprising a number of data lines as a group;
in the top peripheral area, each of the data lines in each of the data line groups is connected to the repair line through a common wiring; and the method further comprises:
performing laser-cutting on the common wiring of each of the data line groups located between the broken data line and the first side peripheral area, until each of the data lines in each of the data line groups located between the broken data line and the first side peripheral area is disconnected from the repair section.

4. The method according to claim 1, wherein, in the step of performing laser-welding on the intersection position between the broken data line and the repair line, two or more laser welding points are disposed at the intersection position between the broken data line and the repair line, and all of laser welding points are located in the top peripheral area.

5. The method according to claim 1, wherein, in the top peripheral area, the array substrate comprises: a base substrate, a first metal layer, an intermediate insulating layer, and a second metal layer which are sequentially stacked, the repair line being disposed at the first metal layer, and each of the data lines being disposed at the second metal layer.

6. An array substrate, comprising:
an active area and a bottom peripheral area, a side peripheral area, and a top peripheral area surrounding the active area;
a data driving circuit, disposed in the bottom peripheral area;
a plurality of data lines, respectively derived from the data driving circuit and extending to the top peripheral area through the active area, the plurality of data lines comprising at least one broken data line each including a first section and a section disconnected with each other;
a repair line, derived from the data driving circuit and extending along the side peripheral area and the top peripheral area, and
a laser welding point, disposed at intersection position between the broken data line and the repair line and located in the top peripheral area, wherein the broken data line is configured to be welded to the repair line through the laser welding point;
wherein, in the top peripheral area, the repair line is configured to be disconnected near the intersection position to form a repair section derived from the data driving circuit and extending along a first side peripheral area and a part of the top peripheral area to be conductive connected with the second section, and among two disconnected sections of each broken data line, for a first section, signals are introduced from the data driving circuit, and for a second section, signals are introduced from the data driving circuit and the repair section.

7. The array substrate according to claim 6, further comprising:
the laser cutting point, disposed at the intersection positions between each of the data lines and the repair section located between the broken data line and the first side peripheral area, and located in the top peripheral area, each of the data lines located between the broken data line and the first side peripheral area being disconnected from the repair section.

8. The array substrate according to claim 7, wherein, all of the data lines of the array substrate are divided into a plurality of data line groups each comprising a number of data lines;
in the top peripheral area, each of the data line in each of the data line groups is connected to the repair line through a common wiring; and
the laser cutting point is disposed on the common wiring of each of the data line groups between the broken data line and the first side peripheral area, each of the data lines in each of the data line groups located between the broken data line and the first side peripheral area being disconnected from the repair section.

9. The array substrate according to claim 6, wherein, two or more laser welding points are disposed at the intersection position between the broken data line and the repair line, and all of the laser welding points are located in the top peripheral area.

10. The array substrate according to claim 6, wherein, in the top peripheral area, the array substrate comprises a base substrate, a first metal layer, an intermediate insulating layer, and a second metal layer, which are sequentially stacked, and the repair line is disposed at the first metal layer, and each of the data lines is disposed at the second metal layer.

11. An active matrix display device, comprising the array substrate, wherein the array substrate comprises an active area and a bottom peripheral area, a side peripheral area, and a top peripheral area surrounding the active area; a data driving circuit, disposed in the bottom peripheral area; a plurality of data lines, respectively derived from the data driving circuit and extending to the top peripheral area through the active area, the plurality of data lines comprising at least one broken data line each including a first section and a section disconnected with each other; a repair line, derived from the data driving circuit and extending along the side peripheral area and the top peripheral area; and a laser welding point, disposed at intersection position between the broken data line and the repair line and located in the top peripheral area, wherein the broken data line is welded to the repair line through the laser welding point; wherein, in the top peripheral area, the repair line is disconnected near the intersection position to form a repair section derived from the data driving circuit and extending along a first side peripheral area and a part of the top peripheral area to be conductive connected with the second section, and among two disconnected sections of each broken data line, for a first section, signals are introduced from the data driving circuit, and for a second section, signals are introduced from the data driving circuit and the repair section.

12. The active matrix display device according to claim 11, wherein the array substrate further comprises the laser cutting point, disposed at the intersection positions between each of the data lines and the repair section located between the broken data line and the first side peripheral area, and located in the top peripheral area, each of the data lines located between the broken data line and the first side peripheral area being disconnected from the repair section.

13. The active matrix display device according to claim 12, wherein all of the data lines of the array substrate are divided into a plurality of data line groups each comprising a number of data lines;
in the top peripheral area, each of the data line in each of the data line groups is connected to the repair line through a common wiring; and
the laser cutting point is disposed on the common wiring of each of the data line groups between the broken data line and the first side peripheral area, each of the data lines in each of the data line groups located between the broken data line and the first side peripheral area being disconnected from the repair section.

14. The active matrix display device according to claim 11, wherein, two or more laser welding points are disposed at the intersection position between the broken data line and the repair line, and all of the laser welding points are located in the top peripheral area.

15. The active matrix display device according to claim 11, wherein, in the top peripheral area, the array substrate comprises a base substrate, a first metal layer, an intermediate insulating layer, and a second metal layer, which are sequentially stacked, and the repair line is disposed at the first metal layer, and each of the data lines is disposed at the second metal layer.

* * * * *